United States Patent

Bonnefous

[11] Patent Number: 5,938,606
[45] Date of Patent: Aug. 17, 1999

[54] METHOD FOR THE PROCESSING OF SIGNALS RELATING TO AN OBJECT COMPRISING MOVING PARTS AND ECHOGRAPHIC DEVICE FOR CARRYING OUT THIS METHOD

[75] Inventor: Odile Bonnefous, Nogent-sur-Marne, France

[73] Assignee: U.S. Philips Corporation, New York, N.Y.

[21] Appl. No.: 08/957,202

[22] Filed: Oct. 24, 1997

[30] Foreign Application Priority Data

Oct. 29, 1996 [FR] France .................................. 96 13191

[51] Int. Cl.[6] ..................................................... A61B 8/00
[52] U.S. Cl. ............................................................. 600/437
[58] Field of Search ................................... 600/437, 440, 600/441, 450, 454, 456, 407

[56] References Cited

U.S. PATENT DOCUMENTS

| | | | |
|---|---|---|---|
| 4,630,612 | 12/1986 | Uchida et al. ........................... | 128/660 |
| 5,360,006 | 11/1994 | Geiser et al. ........................... | 128/653.1 |
| 5,535,747 | 7/1996 | Katakura ................................... | 600/438 |
| 5,579,771 | 12/1996 | Bonnefous ............................... | 128/661.04 |

*Primary Examiner*—George Manuel
*Attorney, Agent, or Firm*—Dwight H. Renfrew, Jr.

[57] ABSTRACT

A signal processing method includes the steps of construction (100), on the basis of sets of signals (S,X,Y,n) relating to an object (6) comprising moving parts, a sequence of graphic images with graphics (REF1, REF2; DP1, DP2) representing the parts (3a, 3b) of the object in motion, at a given scale, with a spatial and temporal marker; construction (30) of a sequence of intensity images [I(X,Y,n)] corresponding to the graphic images; and encrustation (40, 140) of graphics of the graphic images in the corresponding intensity images. This method can be carried out by an ultrasonic echographic apparatus (1) comprising a diagnostic tool (100) and a display system for the construction of the appropriate image sequences.

13 Claims, 4 Drawing Sheets

METHOD FOR THE PROCESSING OF SIGNALS RELATING TO AN OBJECT COMPRISING MOVING PARTS AND ECHOGRAPHIC DEVICE FOR CARRYING OUT THIS METHOD

BACKGROUND OF THE INVENTION

1. Field of the Invention

The invention relates to a signal processing method which includes a step for constructing a sequence of images on the basis of sets of data formed from signals relating to an object comprising moving parts, said sets being periodically acquired over a given time interval. The invention also relates to an echographic device for carrying out this method. The invention is particularly useful for medical echographic imaging as a cardio-vascular diagnostic tool for non-invasive study of anomalies, such as stenoses, of arteries.

2. Description of the Related Art

A diagnostic criterion for a stenosis is an abrupt reduction of the diameter of an artery. Another criterion is the blood velocity beyond the stenosis. Studies have shown that the behavior of the blood in an artery containing stenoses does not satisfy Bernouilli's law concerning fluid flows in a sense that the flow velocity does not increase in conformity with said law in the zone in which the diameter of the artery decreases. To the contrary, the velocity of the blood flow decreases as soon as the diameter of the artery reaches a stricture threshold. Consequently, the artery gradually becomes completely occluded in the zone which is first only constricted, ultimately causing a phenomenon of thrombosis. Moreover, rigid plaques can also appear in the thickness of the walls of arteries. These plaques cause changes of the elasticity of the walls and tensions in the wall which are so large that during the cardiac cycle the arterial wall is distorted to the point of rupture and may emit emboli. Therefore, the medical field has a need for non-invasive means for studying arteries, notably injured arteries, in order to find an explanation for this behavior.

A method for the processing of echographic signals and a device for carrying out this method are already known from the published European patent application EP 0674185, which corresponds to U.S. Pat. No. 5,579,771. The known method includes the acquisition of data, at the output of an echographic system, in the form of acoustic high-frequency signals leaving a probe, the formation of an echographic image consisting of lines of pixels corresponding to the excitation lines of the probe, and the application of a temporal correlation operation to the signals, yielding velocities of displacement of structures in the echographic image.

The proposed method notably includes a step for identifying the position of an artery in a cross-sectional view, a step for calculating the radial velocity of walls of the artery along the excitation lines of the echographic probe used for forming the image, a step for calculating the amplitude of the actual movements of each wall of the artery along the excitation lines, and a step for calculating the dilatation of the artery along the excitation lines.

A technical problem resides in the fact that this data cannot be easily used so that the physician utilizing the echographic image as a diagnostic tool cannot very well profit therefrom directly.

SUMMARY OF THE INVENTION

This problem is solved by means of a signal processing which includes method constructing, on the basis of sets of data formed from signals relating to an object comprising moving parts, said sets being periodically acquired over a given time interval, a sequence of graphic images with one or more parts of the object in motion, at a given spatial scale and with a spatial and temporal marker. This method offers the advantage that it makes this data readily accessible, comprehensible and usable by the physician.

This method can be carried out by an ultrasonic echographic apparatus including a diagnostic tool for carrying out an echographic signal processing method which is provided with a system for constructing a sequence of intensity images, representing an organ comprising moving parts, in which graphics are encrusted, and arranged to reproduce the evolution of motions of said parts of the organ, with an amplified spatial amplitude, over a cardiac cycle, and a system for displaying said sequence of encrusted intensity images. This apparatus offers the advantage that it offers a tool for the diagnosis of anomalies of walls of arteries by providing a tool for visualizing the operation of an artery in the vicinity of a suspect zone during a cardiac cycle.

BRIEF DESCRIPTION OF THE DRAWING

Specific embodiments of the invention will be described in detail hereinafter with reference to the accompanying diagrammatic drawings; therein.

DESCRIPTION OF THE PREFERRED EMBODIMENTS

Figure 1:
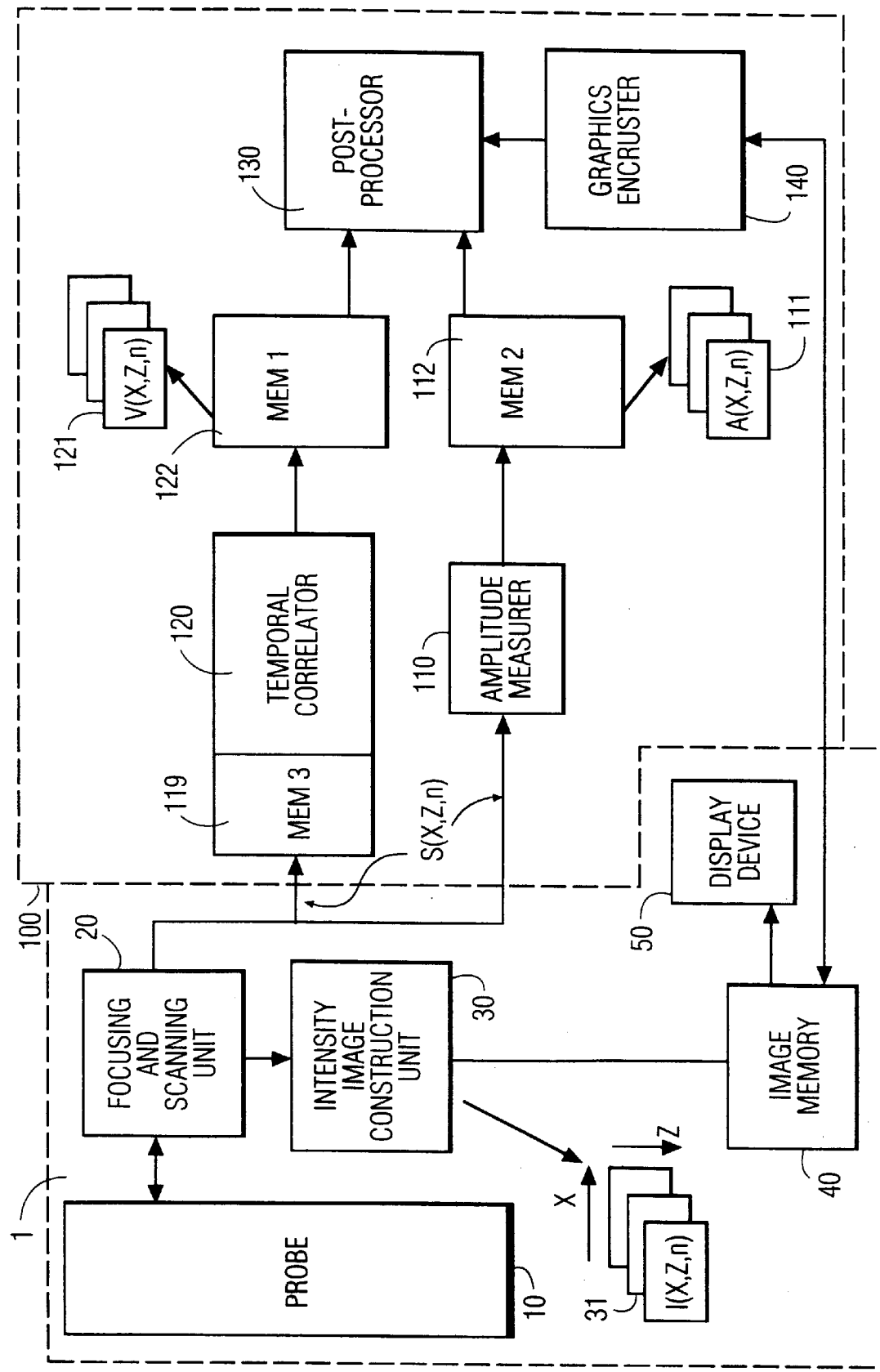
FIG. 1 shows a functional block diagram of a device for determining graphic data which is associated with an echographic apparatus.

FIG. 1 shows an ultrasonic echographic apparatus 1 provided with a diagnostic tool 100. The composite device 1, 100 constitutes a system for the formation and display of a sequence of images in which graphics are superposed on standard echographic images. These graphics diagrammatically represent a moving part of an organ present in the images of the sequence and serve to reproduce the evolution of the movement of the part of the organ, with an increased amplitude, over a predetermined time interval.

The composite device 1, 100 is described for a specific application as a tool for the diagnosis of lesions of arterial walls.

Figure 4A:
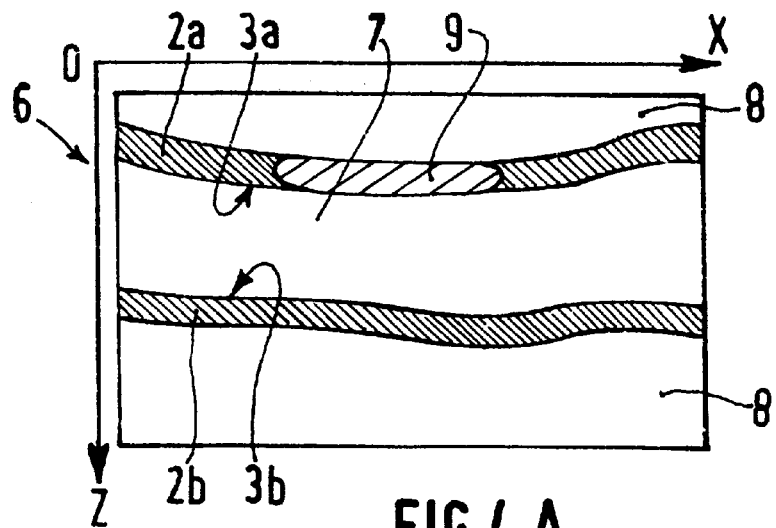
FIGS. 4A to 4C illustrate a method for forming graphic lines superposed on a echographic image in grey levels.

Referring to the FIGS. 1 and 4A, the operation of an echographic apparatus 1 involves a transducer 10 in contact with the medium observed. The transducer 10 transmits, via periodic excitations, ultrasonic signals to the medium scanned, in a direction OZ, and receives, in the same direction OZ, the echoes returned by the obstacles encountered in the medium. The transducer for the envisaged application is composed of ultrasonic transducers which are assembled in a linear array having an orientation OX. A respective excitation line corresponds to each transducer.

During the transmission step the medium is scanned along the directions of the excitation lines. In the receiving mode the image of each excitation line is formed, taking into account the propagation time in the medium and the amplitude of the echoes returned by the obstacles encountered along the excitation line considered. Preferably, in order to obtain a suitable resolution for this image, the ultrasonic excitations are focused during transmission as well as reception. To this end, a small network of djacent ultrasonic transducers is used to transmit and receive an ultrasonic beam which is electronically focused on a point which is situated on the central excitation line of the small network and at a predetermined depth Z within the medium. An intensity image I(X,Z) 21 is thus formed by the scanning of each excitation line of the probe. The focusing and scanning unit 20 cooperating with the probe 10 to provide acoustic high-frequency signals S(X,Z,n) which enable the formation, as a function of the instant n, of a sequence of intensity images I(X,Z,n) by way of an intensity image construction unit 30, n being the number of the image of the sequence. The images can either be displayed directly on a monitor or similar display device 50 or be stored in an image memory which is referred to as CINE-LOOP 40 and wherefrom they can be fetched for further display as required.

Referring to FIG. 1, a device 100 for the processing of high-frequency signals produced by the focusing and scanning unit 20 in cooperation with the probe is associated with the echographic apparatus 1 in order to enable operation thereof in the graphic mode. This graphic mode enables observation of the behavior of an artery, notably of arterial walls, at any instant during a cardiac cycle, while the pulsating wave propagates within the artery which is considered as a waveguide.

Under the influence of the pulsating wave of the blood in the artery during a cardiac cycle, the walls of the artery are subject to a periodic radial movement whose amplitude and velocity can be determined. Depending on the state of the arterial walls, the pressure variations induced by the pulsating wave create either a uniform arterial dilatation or a distorted parietal movement.

The device 100 for the processing of ultrasonic signals includes a processor which executes the steps of forming a sequence of images, including graphic lines reproducing the movements of internal parietal boundaries of a segment of an artery scanned by the echograph, at each scanned point of the parietal boundaries and at each instant n of a cardiac cycle, in conformity with a predetermined spatial amplification scale.

These graphic lines enable the diagnosis of parietal lesions to be based on the shape and on the amplitude of the parietal displacements instead of basing it exclusively on the velocity of the blood flow in the artery and/or on the mean aperture of the artery in the injured region. The ultrasonic signal processing device 100 constitutes a diagnostic tool which enables the detection of a parietal lesion of an artery and also an appreciation of the seriousness thereof by studying the displacement of parietal boundaries with respect to the normal. The ultrasonic signal processing device 100 associated with the echographic apparatus 1 performs the steps of forming and displaying a sequence of standard echographic images in grey levels or intensity levels, provided with these superposed or encrusted graphic lines which reproduce the positions of the internal parietal boundaries of the artery at any instant n of a cardiac cycle, thus simulating the movements of these parietal boundaries which are subject to the pulsating wave during the cardiac cycle, in a manner such that it can be readily used by a physician.

Referring to FIG. 4A, diagrammatically showing a standard echographic intensity image, the observation of the behavior of the arterial walls involves the examination of the medium by the echographic probe 10 in such a manner that the artery is scanned longitudinally in the direction parallel to OX in order to produce longitudinal cross-sectional intensity images of the artery, enabling the visualization of the front wall 2a and the rear wall 2b. The direction of the transducer array is represented by the direction OX and the direction of the excitation lines is represented by the direction OZ. Therefore, the echographic image is scanned along the excitation lines of direction OZ which are the columns of the image.

The behavior of the artery must be observed over a full cardiac cycle. Therefore, a sequence of a number N of images covering a time interval which is at least equal to a cardiac cycle must be formed, N being a number $1 \leq N$.

The behavior of the artery must be observed in relation to the various phases of the cardiac cycle. Therefore, a time marker which is common to the image sequence and to the cardiac cycle must be identified.

The behavior of the artery must be observed in relation to a standard. Therefore, spatial-temporal graphic reference lines REF1, REF2 must be defined and superposed on the images of the sequence, where n represents a number $1 \leq n \leq N$.

The behavior of the artery must be observed qualitatively. Therefore, the graphic lines formed by points must provide the displacements of the arterial walls on each excitation line of an image of the sequence and must also provide the displacements at any instant n of the cardiac cycle, that is to say in each image n of the sequence.

The behavior of the artery must be observed quantitatively. Therefore, the graphic lines must provide the displacements in relation to the reference lines in conformity with a predetermined spatial scale.

For the plotting of the graphic lines representing the movement of the arterial walls it is necessary to determine the velocity and the amplitude of the displacement of the walls. This operation is performed by processing device 100 as a temporal correlation operation shown diagrammatically as being performed by a temporal correlator 120.

During this temporal correlation operation by correlator the successive ultrasonic echoes, produced by the moving biological structures and generated during the preceding focusing and scanning step by unit 20, are compared by way of their correlation function. The displacement of the biological structures from one ultrasonic emission to the next is estimated while taking into account the displacement of the correlation peak corresponding to the delay introduced by this displacement upon reception.

For all objects scanned the correlation operation by correlator 120 provides velocity measurements in the form of two-dimensional velocity images V(X,Z,n) which are denoted by the reference 121 and are stored in a memory 122 which is called MEM1.

The object of the diagnostic tool or processing device 100 being based on the observation of parietal movements, the velocities corresponding to the parietal movements are thus localized. This localization is realized by way of an image processing method carried out by processing device 100 which is referred to as a post-processing method and is shown diagrammatically as being carried out by a post-processor 130. The post-processing includes a step for determining the locations of the arterial walls in the corresponding echo amplitude images A(X,Z,n) which are denoted by the reference 111, are determined by an operation carried out by processing device 100 for measuring the amplitudes of echoes which is shown diagrammatically as an amplitude measurer 110. The measured amplitudes are stored in a memory 112, referred to as MEM2. Processing device 100 transfers also the locations of the arterial walls in the velocity images 121.

Instantaneous mean parietal spatial velocities are then determined and integrated in time in order to provide the corresponding parietal displacements.

Graphic lines formed during the post processing operation post-processor 130, simulating the previous and later parietal displacements D1 and D2, respectively, are encrusted, during an operation shown diagrammatically as being carried out by a graphics encruster 140, in each image of the sequence of images fetched from the memory CINE-LOOP, the images again being stored in the memory CINE-LOOP after encrustation.

An echographic configuration is implemented especially for compliance with the range of parietal displacements. The artery segment studied is scanned two-dimensionally by focusing and scanning unit 20, as quickly as possible, and the temporal correlation operation by temporal correlator 120 is performed one image after the other in the sequence. The recurrent period is taken to be equal to the image period which is called $T_{FRAME}$. The range of radial velocities V of the arterial walls is linked to the image period $T_{FRAME}$, to the ultrasonic frequency $f_o$, and to the propagation velocity C of sound in the medium as:

V. $T_{FRAME} = C/4\ f_o \cong 0.75$ mm while assuming that C=1.5 mm/µs and $f_o$=5 MHZ.

The maximum parietal velocity is of the order of 10 mm/s. Consequently, an image period must be of the order of:

$T_{FRAME} \cong 7.5$ ms.

This image period $T_{FRAME}$ corresponds to a high image production rate. Consequently, for each image multiple transmissions will not be available for each excitation line of the echographic image and only a single focusing will be used in the transmission mode. When the device 1, 100 is used for the observation of the peripheral ascularization or for the study of, for example the carotid artery, where the excitation depth is less than 4 cm, the recurrent frequency is approximately 15 kHz in the transmission mode. The number of image excitation lines may be, for example 68 with a scanning step (distance between excitation lines) of 0.5 mm; the number of image excitation lines may also be 112 with a scanning step of 0.25 mm. These characteristics enable visualization of an arterial segment of 28 mm. The delay between the signals corresponding to each excitation line of the image may be adjusted by increasing or decreasing the number of excitation lines and the distance between the excitation lines.

Referring to FIG. 1, the correlation function is based on the same principle as the method described in EP 0 674 185, which corresponds to U.S. Pat. No. 5,579,771. However, the present correlation function is performed between the images of the image sequence so that it is necessary to have a rather large memory 119 MEM3 available at the input of the module performing the correlation operation. This memory must provide the necessary delay between two correlated signals. Moreover, in order to enhance the exactness of the measurements, preferably several correlation functions are averaged. The number of correlations is typically $N_c$=4.

A memory implementation utilizing the principle of inputs ccording to the rows and outputs according to the columns of the emory is more efficient than the averaging of correlations performed in the correlation operation itself, because it enables calculation of all correlations simultaneously. The memory 119 MEM3 must contain the 1-bit signals of the $N_c$+1 echographic images. However, the size of said memory MEM3 can be reduced by considering only an image area of interest which includes the artery.

In the case of a number of image excitation lines 112, an examination depth of 20 mm, an ultrasonic frequency $f_o$=7.5 MHz and a sampling frequency $f_s$=30 MHz, an image corresponds to 90 kbits. Consequently, for the parameters given above, 450 kbits are necessary for calculating a velocity image. Consequently, a memory of 256 kb, 50 ms, suffices for the correlation operation.

The correlation operation, executed substantially as disclosed in the cited document (EP 0 674 185), produces velocity images 121 V(X,Z,n). On the other hand, echo amplitude images 111 A(X,Z,n) are also necessary and are obtained by means of an amplitude measuring operation 110 as described in the same cited document.

The memories 122 MEM1 and 112 MEM2 store the results of the correlation operation 120 and the amplitude measuring operation 110, respectively, being the corresponding velocity images V(X,Z,n) and echo amplitude images A(X,Z,n), which images are referred to herein as processed images. It is not necessary to store the value of the correlation peaks.

The post-processing operation 130 performed by post-processor is dedicated to the use of the results of the preceding temporal correlation and amplitude measurement operations, that is to say first for the calculation of the post-processing parietal velocities. The principal steps of the operation 130 are the extraction and the localization of the parietal velocities of the two-dimensional velocity images. These steps are carried out while using the amplitude images 111 as segmentation means. Subsequently, a step for the spatial averaging of the parietal velocities is carried out by accumulating the parietal velocities from one image to the next in the sequence in order to obtain the parietal displacements.

The resultant displacements D1, D2 are processed so as to determine reference instants n1, n2 of the cardiac cycle at which the displacements must be set to zero. A correction is applied to the displacement curves in order to ensure a cyclical behavior of the artery, corresponding to a fixed and stable spatial reference position of the walls at the start of each cardiac cycle.

Figure 2:
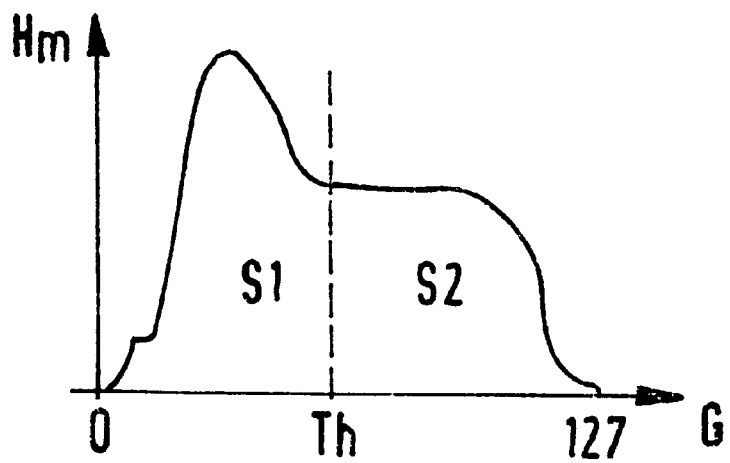
FIG. 2 shows a histogram Hm of the echographic image in grey levels G.

During the post-processing operation performed by post-processor 130 an adaptable threshold Th is calculated for each amplitude image 111 A(X,Z,n) in order to perform the identification of the internal parietal boundary of the artery. This threshold Th is determined with reference to FIG. 2 while forming a histogram Hm(G) of each amplitude image 111 as is shown, by way of example, in FIG. 3A. The histogram Hm(G) represents the number Hm of points of the image having each grey level G present in the image, for example from 0 to 127. The histogram Hm(G) is divided into two parts S1 and S2 of equal weight. The threshold Th corresponds to the grey level situated at the boundary between the parts S1 and S2.

The following is a feasible implementation. The surface area of the histogram is calculated:

$$S_m = \sum_{k=0}^{k=m} H_k$$

therein, m is the number of grey levels present in the image and k is a grey level from 0 to m, and a surface area $S_P = S_m/2$ is determined.

The threshold Th is given by:

$Th = \alpha S_p$ where α is a proportionality factor which is dependent on the gain used for the acquisition of the echographic image.

Figure 3A:
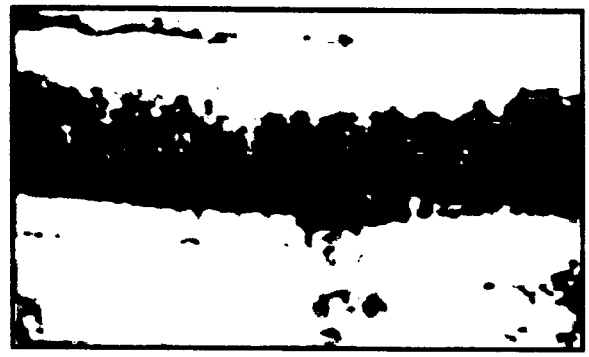
FIGS. 3A to 3C illustrates a method for digitizing the echographic image.
Figure 3B:

The threshold Th is applied to the amplitude images, as shown in FIG. 3A, in order to produce digital images as represented in FIG. 3B. An image such as that shown in FIG. 3B does not yet enable determination of the parietal boundaries, that is to say the boundaries 3a and 3b as shown diagrammatically between the walls 2a, 2b and the caliber 7 of the artery 6 in FIG. 4A. Thus, the digital image obtained in FIG. 3B, where the interior of the artery is black and the exterior is white, shows a black/white transition which corresponds to these peripheral boundaries-and is far from smooth.

Figure 3C:
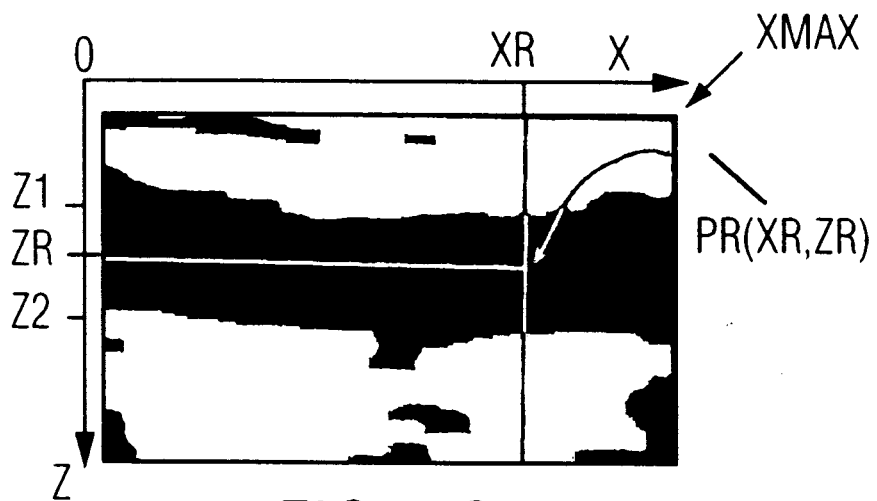

A morphological filtering operation is then performed on the digital image in order to smooth the transitions and to eliminate the residual spots remaining in the aperture of the artery. This two-dimensional filtering operation is reduced to two one-dimensional filtering operations, being:

a morphological opening operation followed by a morphological closing operation along the echographic axis having the direction OZ, thus eliminating the spots occasionally present in the arterial aperture. The width of the structuring element is 0.75 mm, corresponding to 5 pixels, when the output sampling frequency is 5 MHZ;

a morphological closing operation followed by a morphological opening operation, ensuring continuity of detection of the parietal boundaries. The width of the structuring element is 1.25 mm, corresponding to 5 echographic lines in the case of a scanning step of 0.25 mm; FIG. 3C shows a digital image obtained by means of these morphological filtering operations.

Referring to FIG. 3C, the transitions corresponding to the internal parietal boundaries are smoothed in this filtered digital image.

The post-processing operation performed by post-processor 130 subsequently includes a step for the detection of internal parietal boundaries 3a, 3b. A reference point, denoted as:

$P_R (X_R, Z_R)$ and known to be situated in the interior 7 of the artery, that is to say in the black part of the image of FIG. 3C, is selected as the starting point for a scan for searching the boundary points. The image is thus scanned along the excitation lines of direction OZ in order to detect the points situated on these boundaries.

In the image of FIG. 3C, starting from the reference position $(X_R, Z_R)$; the first non-zero pixels having the co-ordinates $[X_R, Z_1(X_R)]$ in the direction of the top of the image is determined on the same excitation line, and subsequently the first non-zero pixel having the co-ordinates $[X_R, Z_2(X_R)]$ towards the bottom of the image is determined in the same way. These two points provide the positions of the internal parietal boundaries on the excitation line considered.

The same operation is performed on the other lines of the image: for each line to the right and to the left of the image, a reference point $P_R$ is considered on the relevant line, and the first points towards the top and towards the bottom of the image which are not zero are detected. The reference points considered are derived from the boundaries previously determined. For an increment to the right, $P_R$ is defined as:

$P_R\{X_R, [Z_1(X_R-1)+Z_2(X_R-1)]/2\}$

For an increment to the left, $P_R$ is defined as:

$P_R\{X_R, [Z_1(X_R+1)+Z_2(X_R+1)]/2\}$

Two curves $Z_1(X)$ and $Z_2(X)$, corresponding to the lower and upper internal parietal boundaries 3a, 3b, are then available. These curves themselves are filtered so as to eliminate large residual local discontinuities of the parietal boundaries as appears, for example, in FIG. 3C.

The post-processing operation performed by post-processor 130 also includes a step for determining parietal displacement values D1 and D2.

For each line having the co-ordinate X of each image n of the sequence of images the displacements D1 and D2 are calculated as follows:

$Z = Z1(X) + \Delta Z$ $$D1(X,n) = \sum_{k=0}^{k=n} \sum_{Z=Z_1(X)}^{Z=Z_1(X)-\Delta Z} V(X, Z, n)$$

$$D2(X,n) = \sum_{k=0}^{k=n} \sum_{Z=Z_2(X)}^{Z=Z_2(X)+\Delta Z} V(X, Z, n)$$

ΔZ represents the thickness of the arterial wall. In the current implementation, this value amounts to approximately 1 mm.

The sums Σ in the above formula correspond first of all to an average value of the velocities through the thickness of the arterial wall, and hence through the selected thickness of 1 mm, and subsequently to a temporal integration of the incremental displacements between each image recurrence. The temporal integration must be corrected by a constant which determines the reference position corresponding to an initial instant, coincident with the starting instant of the cardiac cycle, where the artery is considered to be non-dilated, i.e. has parietal displacements equal to zero.

To this end, the starting instant of the cardiac cycle, referred to as the reference instant or temporal marker, must be accurately identified. The reference instant is determined by analysis of the temporal variations of the mean arterial dilation along the longitudinal arterial axis (OX). This mean dilation D(n) is calculated as the difference between the displacements of the two walls, integrated from the co-ordinate X=0 to the co-ordinate X=$X_{max}$ in the longitudinal direction:

$$D(n) = \sum_{X=0}^{X=X_{MAX}} D_2(X, n) - D1(X, n)$$

Figure 5:
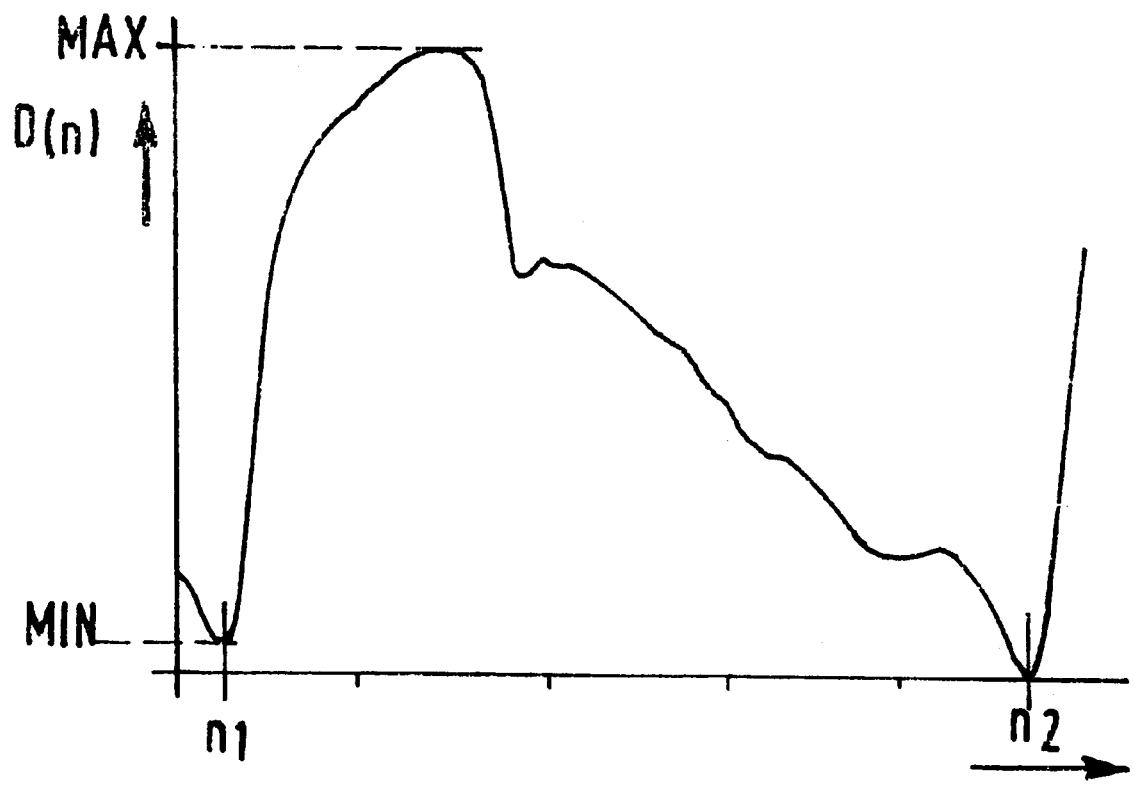
FIG. 5 shows a curve relating to the parietal displacements D(n) of an artery as a function of temporal instants n.

The curve D(n) is shown in FIG. 5. The abscissae n1 and n2 must be identified as starts of cardiac cycles by means of an automatic method. To this end, the minimum and maximum values MIN and MAX are detected on the curve of FIG. 5 and a function f(n) is calculated on the basis of these detections. The function f(n) is defined as:

If $[D(n)-MIN]/(MAX-MIN) > D_0$, then f(n)=0 Else, f(n)=1.

Consequently, the function f(n) validates the segments of the curve D(n) which are below a predetermined value $D_0$. On each of these segments the minimum values of D(n) are determined and the corresponding instants n1, n2 are stored. These instants n1 and n2 are assumed to correspond to the starts of successive cardiac cycles.

A cardiac cycle thus having been defined by the instants n1 and n2, the displacement curves D1(X,n) and D2(X,n) are corrected as follows:

$$d1(X,n) = D1(X,n) - D1(x,n1) - \frac{(n-n1)}{(n2-n1)}[D1(X,n2) - D1(X,n1)]$$

$$d2(X,n) = D2(X,n) - D2(x,n1) - \frac{(n-n1)}{(n2-n1)}[D2(X,n2) - D2(X,n1)]$$

After these corrections, the parietal displacements D1 and D2 can be represented in relation to the spatial reference positions corresponding to the temporal markers indicating the starts of the cardiac cycles.

Figure 4B:
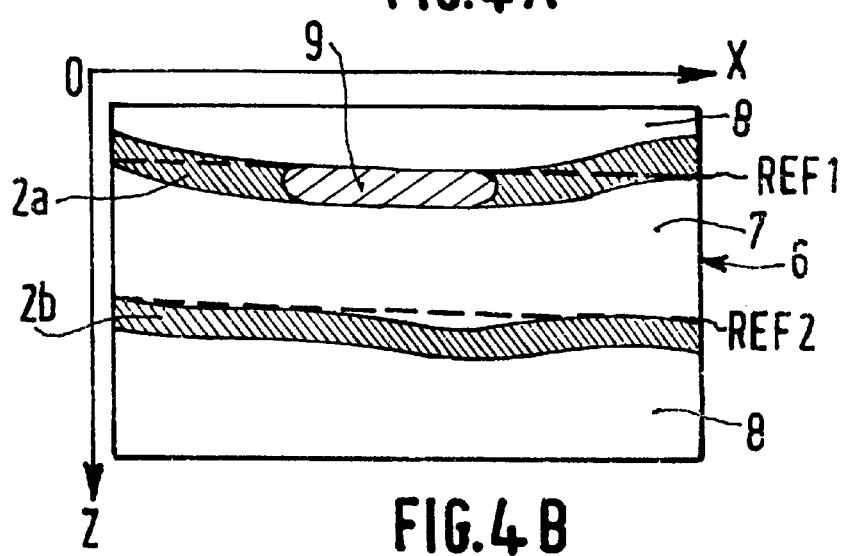
Figure 4C:
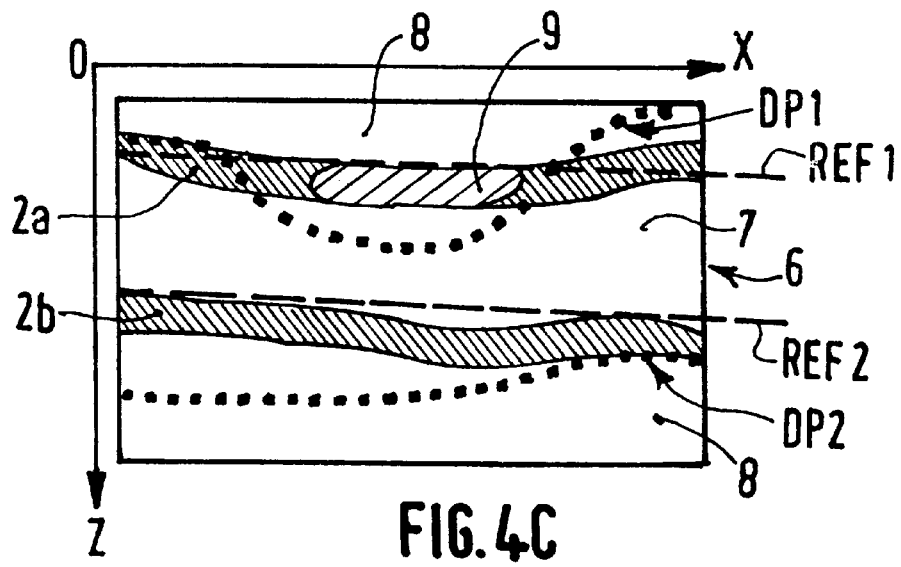

Referring to the FIGS. 4B and 4C, the operation performed by graphics encruster 140 involves the graphic superposition of curves corresponding to the parietal displacements D1 and D2 and of reference lines called REF1 and REF2 on the standard echographic images or corresponding intensity images I(X,Z,n) which are stored in the memory CINE-LOOP. The reference lines REF1 and REF2 are derived from the parietal boundary curves extracted from the amplitude images, corresponding to the start of the first cardiac cycle of the image sequence, and are calculated by means of a linear regression method which is known per se.

Referring to the FIGS. 4B and 4C, each image n of the sequence is provided with reference lines REF1, REF2 and with lines DP1, DP2 which represent the displacement of each point of the parietal boundaries at the instant n. The images of the sequence are again stored in the memory CINE-LOOP so as to be displayed on the display device 50.

During the display of the sequence on the display device 50, the physician can qualitatively and quantitatively evaluate the distortions or non-distortions of the graphic lines simulating the displacements of the walls and derive therefrom the presence and the seriousness of stenosis, or elasticity defects, linked to the arterial walls of the subjacent echographic image. The visualization of the arterial dilation in real time, nevertheless delayed by a second so as to enable identification of the instants corresponding to the starts of the cardiac cycle and also correction of the displacements, also enables optimization of the position of the echographic probe so as to obtain a cross-sectional plane which passes through the arterial axis parallel to OX.

The invention has been described in relation to the processing of echographic signals, but can also be applied to the processing of signals of a different nature: electric, electromagnetic, etc.

What is claimed is:

1. A signal processing method comprising:
   acquiring sets of data from echographic signals relating to an organ comprising moving parts, said sets being periodically acquired over a given time interval,
   constructing on the basis of the sets of data a sequence of intensity images and corresponding sequences of processed images and
   encrusting spatial graphics derived from the processed images onto the intensity images, the graphics comprising representations of locations of at least one or more moving parts of the organ, at a given spatial scale, and of a spatial and temporal reference marker.

2. A method as claimed in claim 1, wherein the graphics comprise representations of the at least one moving part(s) of the object in a reference position and/or of amplified movement of the moving part(s) at the given spatial scale.

3. A method as claimed in claim 1, in which the organ is a segment of an artery which is explored along its longitudinal axis, the moving part(s) of said organ, represented diagrammatically by one or more graphics, representing one or more internal parietal boundaries of said arterial segment.

4. A method as claimed in claim 3, wherein the step of constructing further comprises storage of the intensity images in a read/write memory, and wherein the step of encrusting further comprises:
   correlation in order to produce a sequence of velocity images of the parietal boundaries of the arterial segment,
   measurement of the amplitude of the echographic signals in order to supply a sequence of corresponding amplitude images,
   post-processing including determination of the locations of the internal parietal boundaries in the amplitude images, transfer of the locations of said parietal boundaries to the corresponding velocity images, and construction of graphic lines on the basis of the locations of said parietal boundaries, and
   encrusting said graphic lines in the intensity images stored in the read/write memory in order to supply a sequence of encrusted intensity images, including the graphic lines reproducing the motions of the internal parietal boundaries of said explored arterial segment, at parietal boundary points, and at instants of a cardiac cycle forming the time interval, in accordance with the predetermined spatial scale.

5. A method as claimed in claim 4, in wherein the post-processing further comprises:
   determining displacements of the parietal boundaries on the basis of radial velocities of said parietal boundaries, including determination of a correction constant for the parietal boundary displacements, yielding a reference position corresponding to a starting instant of a cardiac cycle, representing said temporal marker, and
   determining the location of the parietal boundaries, including digitization of the amplitude images, and determination of the boundary points as the transition points according to a threshold between the points inside the artery, in the digitized amplitude images, and other points.

6. The method of claim 4 wherein the graphics comprise representations of the at least one moving part of the object in a reference position and/or of amplified movement of the moving part(s) at the given spatial scale.

7. A method as claimed in claim 1 wherein the step of constructing further comprises storage of the intensity images in a read/write memory, and wherein the step of encrusting further comprises:
   correlation in order to produce a sequence of velocity images of the at least one moving part of the organ,
   measurement of the amplitude of the echographic signals in order to supply a sequence of corresponding amplitude images,
   post-processing, including determination of the locations of the at least one moving part in the amplitude images, transfer of the locations to the corresponding velocity images, and construction of graphic lines on the basis of the locations, and
   encrusting said graphic lines in the intensity images stored in the read/write memory in order to supply a sequence of encrusted intensity images, including the graphic lines reproducing the motions of the at least one moving part of the organ at the periodic instants of the time interval, in accordance with the predetermined spatial scale.

8. A method as claimed in claim 7 wherein the post-processing further comprises:

determining displacements of the of the at least one moving part on the basis of velocities of the at least one moving part, including determination of a correction constant for the displacements of the at least one moving part, yielding a reference position corresponding to a starting instant representing said temporal marker, and determining the location of the at least one moving part, including digitization of the amplitude images, and determination of the boundary points as the transition points according to a threshold in the digitized amplitude images.

9. The method of claim 7 wherein the graphics comprise representations of the at least one moving part of the object in a reference position and/or of amplified movement of the moving part(s) at the given spatial scale.

10. The method of claim 1 wherein the sequences of processed images comprise a sequence of velocity images and a sequence of amplitude images.

11. An apparatus comprising:

an echographic apparatus for acquiring sets of data from echographic signals relating to an organ comprising moving parts, said sets being periodically acquired over a given time interval, and for constructing on the basis of the sets of data a sequence of intensity images, a signal processing device for encrusting spatial graphics on corresponding intensity images, the encrusted graphics are derived from sequences of processed images based on the acquired sets of data and comprise representations of the evolution of motions of one or more moving parts of the organ, with an amplified spatial amplitude, over a cardiac cycle, and of a spatial and temporal reference marker, and a system for displaying said sequence of encrusted intensity images.

12. An apparatus as claimed in claim 11, wherein the signal processing device further comprises means for the construction of graphics which diagrammatically represent one or more moving parts of the organ in a reference position and/or motion of the one or more involving parts at each instant, spatially amplified according to the predetermined spatial amplitude.

13. An apparatus as claimed in claim 11, wherein the echographic apparatus further comprises a probe with ultrasonic transducers which provides, by exploration of said member, a series of standard echographic signals for construction of a sequence of intensity images of said organ and a read/write memory for storing the intensity images and wherein the signal processing device further comprises:

means for carrying out a temporal correlation step and for supplying and storing a sequence of velocity images, means for carrying out a step for measuring echographic amplitudes and for supplying and storing a corresponding sequence of amplitude images, post-processing means which localizes, on the basis of the corresponding velocity and amplitude images, the velocities on the moving parts of the organ, determines the corresponding displacements and constructs graphic curves of these displacements, and graphic encrustation means which encrusts said graphic curves on the images of the sequence stored in the image memory and, among these curves, the reference curves and the displacement curves.

* * * * *